United States Patent [19]

Barnes

[11] Patent Number: 5,690,709
[45] Date of Patent: Nov. 25, 1997

[54] SEPARATION APPARATUS TO REMOVE PARTICLES FROM A GAS STREAM

[76] Inventor: Peter Haddon Barnes, 29 Kokoda Avenue, Wahroonga, New South Wales 2076, Australia

[21] Appl. No.: 692,090

[22] Filed: Aug. 6, 1996

[30] Foreign Application Priority Data

Aug. 9, 1995 [AU] Australia ............................ PN4740

[51] Int. Cl.⁶ .......................................... B01D 45/12
[52] U.S. Cl. ......................... 55/348; 55/318; 55/343; 55/350.1; 55/452; 55/257.6
[58] Field of Search ............................ 55/318, 342, 343, 55/345, 346, 347, 348, 349, 350.1, 452, 457, 257.4, 257.6, 459.1, 459.3

[56] References Cited

U.S. PATENT DOCUMENTS

| | | | |
|---|---|---|---|
| 2,986,278 | 5/1961 | Bjorklund | 55/348 |
| 3,061,994 | 11/1962 | Mylting | 55/346 |
| 4,144,043 | 3/1979 | Johnston | 55/457 |
| 4,212,653 | 7/1980 | Giles | 55/459.3 |
| 4,289,611 | 9/1981 | Brockmann | 55/348 |
| 4,863,500 | 9/1989 | Rombout et al. | 55/348 |
| 5,372,707 | 12/1994 | Buchanan et al. | 55/459.1 |

*Primary Examiner*—Jay H. Woo
*Assistant Examiner*—Minh-Chau T. Pham
*Attorney, Agent, or Firm*—Edwin D. Schindler

[57] ABSTRACT

A separator (13) to remove particles from a gas stream, the separator (13) includes a casing (11) divided into three zones (A,B,C) by two divider plates (9,10). A plurality of uniflow cyclone separators (12) are supported by the divider plates (9,10) and provide communication between the first zone (A) and the other two zones (B,C). Particle carrying gas enters the first zone (A) through an inlet (18) and as major cleaned streams discharge from the cyclone separators (12) into the third zone (C) and as minor particle carrying streams discharge into the second zone (B) to be discharged from the casing 11.

6 Claims, 4 Drawing Sheets

SEPARATION APPARATUS TO REMOVE PARTICLES FROM A GAS STREAM

FIELD OF THE INVENTION

This invention relates to the removal of particulate material from a gaseous carrier. The invention has particular relevance to the petroleum industry but is not limited to use in that field.

BACKGROUND

In the petroleum industry there is a need to separate fine catalyst dust from the large stream of hot flue gas leaving the regenerator vessel of a Fluid Catalytic Cracking (FCC) Unit. In global and economic terms, the FCC process is the oil industry's major oil conversion process. Inside the FCC reactor, low value heavy oil is cracked at around 500–550 deg C to lighter, more valuable products over a fluidised, micro-spherical catalyst with a particle size range typically 1–100 micron. During the process, coke laydown deactivates the catalyst and the catalyst must then be burned clean at around 680–730 deg C in a large fluid bed contained in a pressure vessel called the FCC "regenerator"

The hot flue gas rising from this combustion process in the regenerator entrains a huge amount of catalyst dust, most of which is promptly intercepted by (usually) 2 stages of reverse flow cyclones inside the regenerator and is returned to the regenerator bed. The cyclone recovery system cannot be 100% efficient and there is always some carryover of fine catalyst particles in the large exhaust stream leaving the top of the regenerator vessel resulting in a typical flue gas dust load at this point of 250–500 mg/Nm$^3$. This is nearly always higher than the limit set by local clean-air laws, which currently average around 100 mg/Nm$^3$ but can range from 50–250 mg/Nm$^3$ over various countries).

As a result of such environmental regulations, virtually all FCC units now have hardware downstream of the regenerator to remove additional catalytic fines from flue gas. The cheapest and most popular method to achieve such dust removal is the "Third Stage Separator" (TSS). This is a second pressure vessel operating at full regenerator temperature and pressure (eg. 700 deg C, 1.7 barg) housing a cluster of high efficiency reverse flow cyclones. These are called third-stage cyclones because they are placed after the normal first and second stage cyclones. Unlike other cleaning methods, such as Wet Scrubbers which work on cooled flue gas at ambient pressure, the TSS option not only reduces FCC emissions but also protects the blades of energy saving flue gas expanders from erosion by catalyst dust.

Logically the TSS cyclones should be designed with a smaller "d-50" characteristic than the regenerator cyclones The term "d-50" refers to the diameter in microns of a dust particle which has a 50% chance of being caught by the cyclone. Theoretically, the TSS attains a smaller d-50 than the regenerator cyclones by using a larger number of smaller cyclones in parallel, with higher gas inlet velocities. The actual preferred number and size of TSS cyclones for a given flue gas stream can vary by more than a factor of ten between the various existing TSS manufacturers. All manufacturers employ the conventional "reverse-flow" cyclone in their designs, as is hereinafter described, and these can easily remove over 80% of the relatively coarse dust particles larger than 5 microns. However, these designs have difficulty catching even 30% of the very fine particles below 3 microns, called "ultra-fines". It is the ultra-fines which generally control the dust load and the visibility of every FCC stack discharge, even when protected by a TSS. Existing TSS designs seldom achieve flue gas dust loads lower than about 100 mg/Nm$^3$, while those without underflow gas and/or with relatively large cyclones typically clean gas to only about 200 mg/Nm$^3$.

SUMMARY OF THE INVENTION

Generally stated the present invention provides separator apparatus to remove particles from a gas stream, said separator apparatus including a casing divided into three zones by two divider plates, a plurality of uniflow cyclone separators supported by said divider plates and providing the communication between the first of said zones and the other two zones, a gas supply port to the first of said zones, a gas discharge means from the third of said zones to discharge overflow gas from said cyclone separators to the exterior of said casing, and a gas discharge means from the second of said zones which passed through said third zone and discharges underflow gas from said cyclone separators to the exterior of said casing.

DETAILED DESCRIPTION OF THE DRAWINGS

Figure 1:
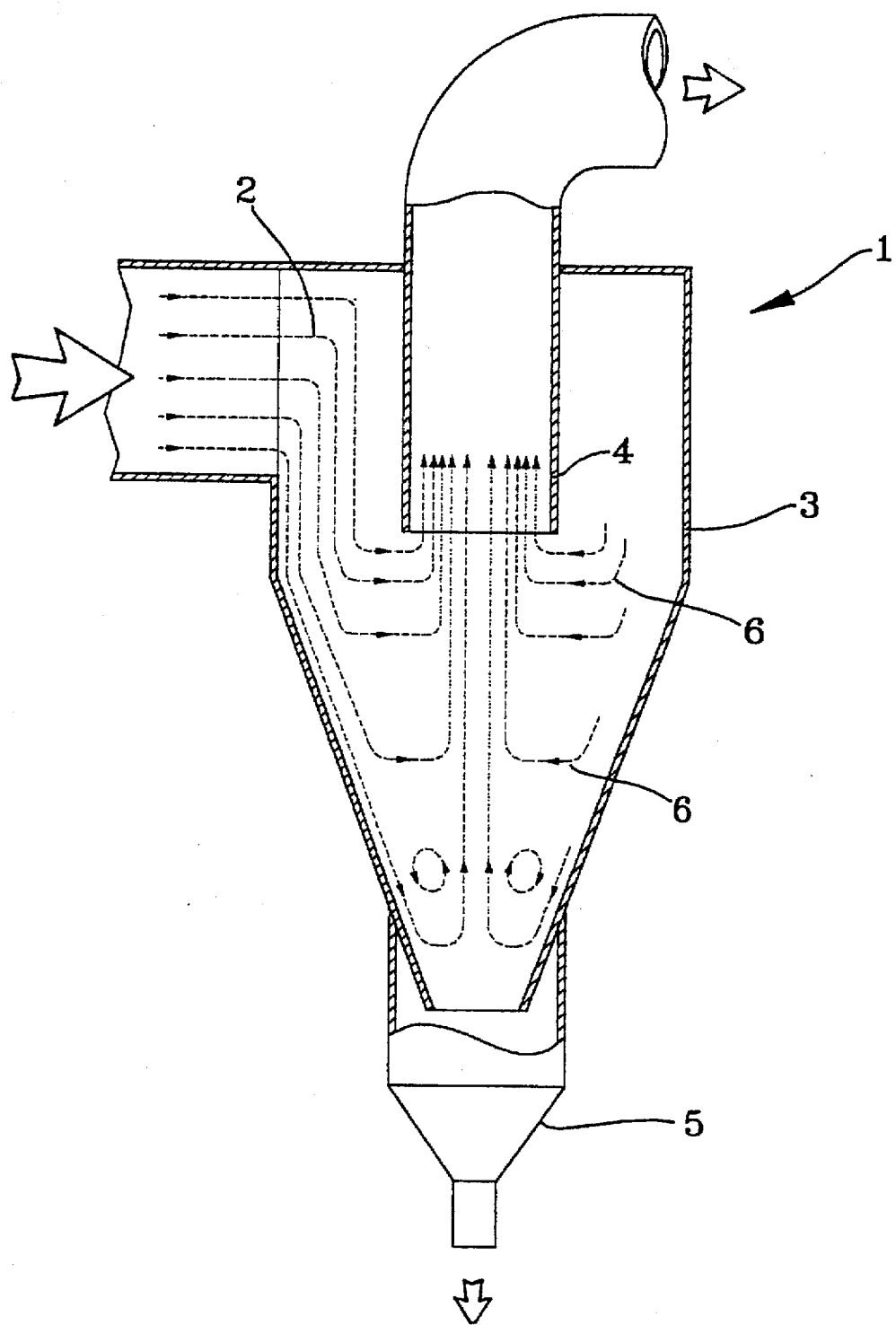
FIG. 1 is a schematic elevation of a reverse flow cyclone of known type.
Figure 2:
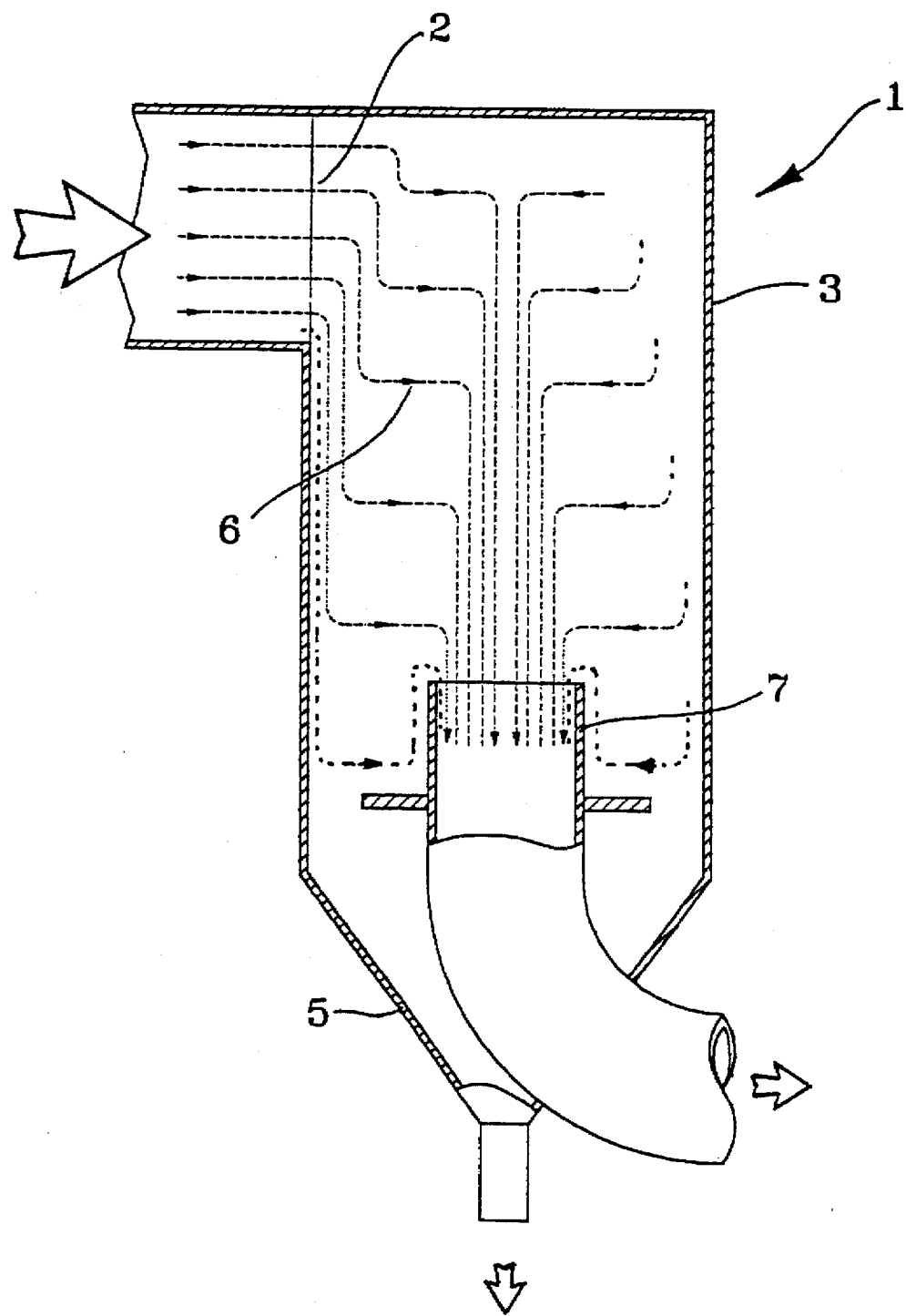
FIG. 2 is a schematic elevation of a uniflow cyclone of known type.

FIG. 1 shows a reverse flow cyclone 1, where incoming gas 2 swirls down the cyclone barrel 3, reverses axial-direction and swirls in a central vortex back as an overflow stream to a gas outlet nozzle 4 at the original gas-inlet end of the cyclone 1. Dust particles, which may be transported in a small stream of underflow gas stream, leave the cyclone via the solids outlet nozzle 5. In FIG. 1 flow channels of similar radial mass flux are shown by dotted lines 6. Close lines 6a indicate high velocities, and hence high inward forces adjacent the inlet to the nozzle 4 more readily drag finer dust to the gas outlet and the wider spaced lines 6b indicate lower velocities. The FIG. 3 arrangement of the present invention will be hereinafter called the "Uniflow TSS". The FIG. 3 arrangement employs a parallel set of cyclones of the uniflow type as illustrated in FIG. 2 where the incoming gas 2 swirls from the top end of the cyclone barrel 3 and, while retaining a uni-directional axial flow spins via a central vortex to a gas outlet nozzle 7 at the cyclone bottom end. Dust particles, with a greater or lesser amount of underflow gas, leave the cyclone via its solids outlet nozzle 5. The illustrated flow pattern gives a much more uniform gas residence time, as indicated by the more regularly spaced mass flux lines 6 in FIG. 2, than exists in the reverse-flow cyclone of FIG. 1. This largely eliminates such problems as axial fluid shear, turbulence, gas recirculation, vortex wall-precession and catalyst attrition, which all limit performance of the traditional reverse-flow cyclone of FIG. 1. As a result it has been found that the uniflow cyclone of FIG. 2 can separate over 90% of FCC catalytic-fines below 3 microns, and is thus able to clean FCC flue gas to a particulates level better than 50 mg/Nm$^3$. This is typically a factor 2 to 5 times lower than possible with reverse-flow cyclones of similar dimensions treating the same dusty flue gas stream.

Figure 3:
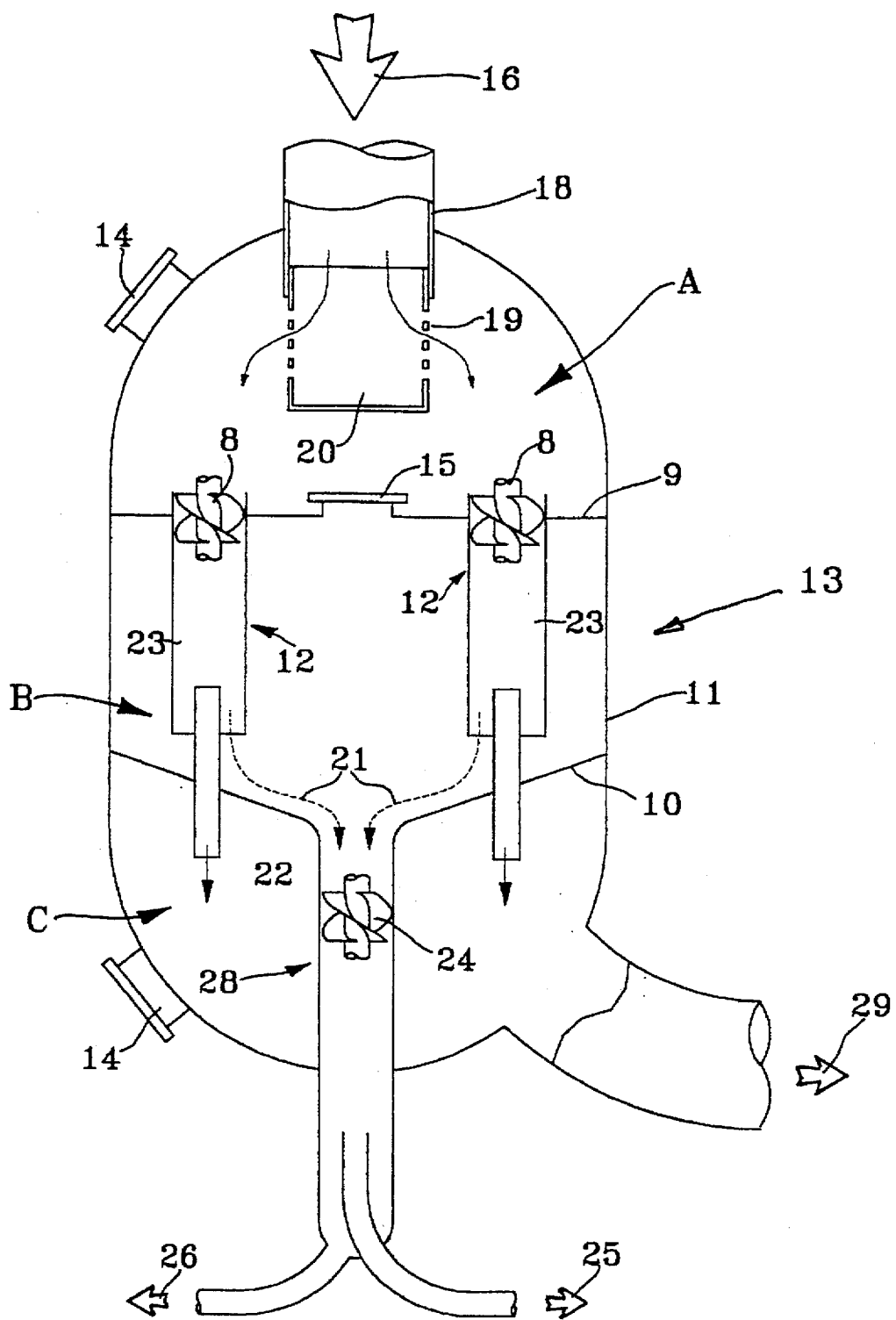
FIG. 3 is a schematic elevation of one form of the dust separator of the present invention.

The Uniflow TSS 13 of the present invention as illustrated in FIG. 3 is more space efficient than the known alternative reverse-flow designs. Multiple uniflow cyclones 12 with axial gas-entry via swirl-vane packs, indicated 8 in FIG. 3, can be very closely arranged over the surface area of tube supporting sheets 9 and 10 in the casing 11, see the representative arrangement illustrated in FIG. 4. This arrangement is facilitated by the fact that gas in-flow and gas out-flow occur at opposite ends of of the cyclone 12, allowing the full unobstructed TSS-vessel cross-sections "A" and "C" to serve respectively as manifolds for the direct axial flow of total flue gas into the uniflow cluster of cyclones 12 and discharge of the overflow stream of cleaned gas indicated 29.

Figure 4:
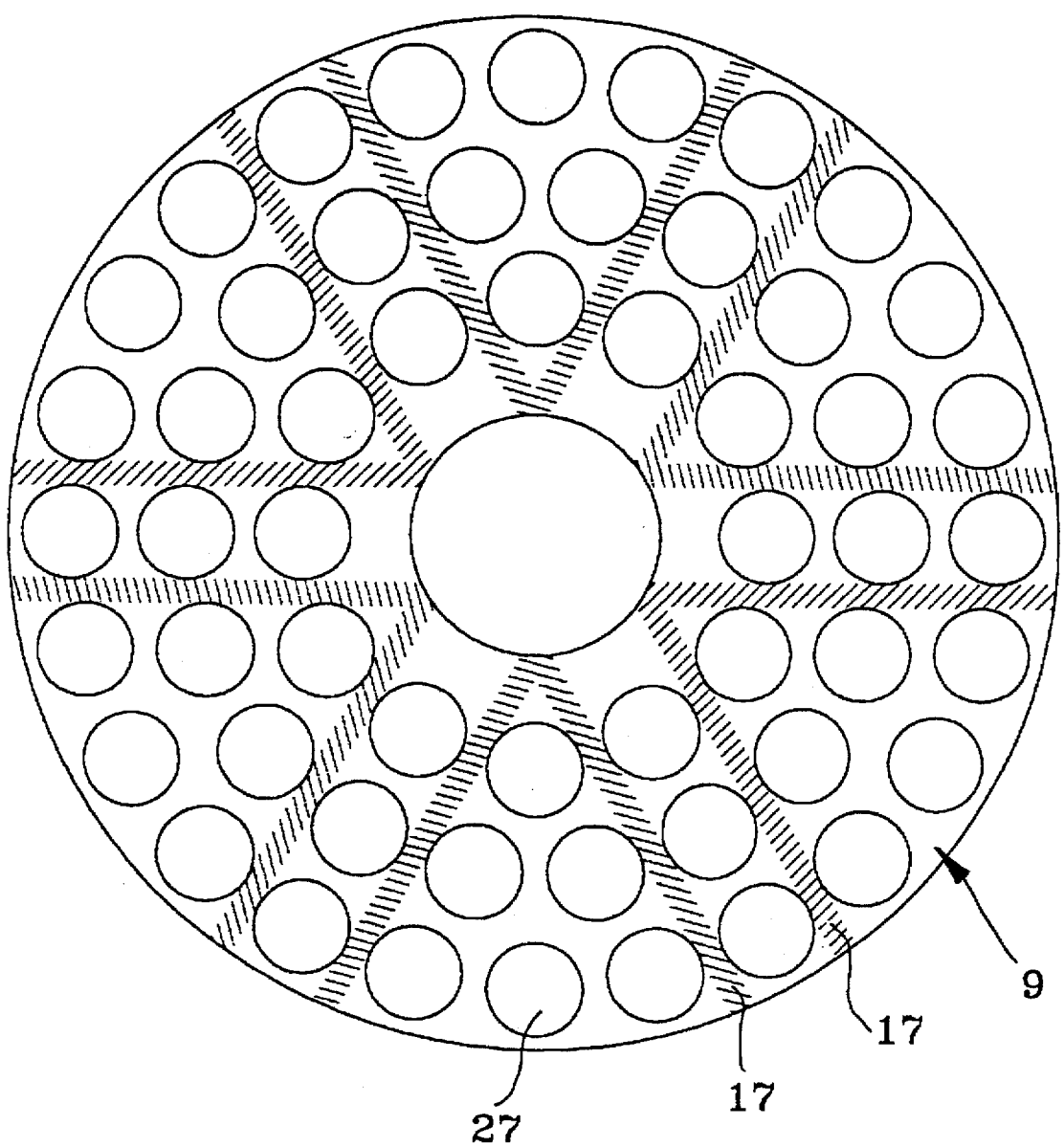
FIG. 4 is a plan view of a cyclone mounting plate as used in the separator of FIG. 3.

The arrangement of discrete cyclone receiving apertures 27 shown in FIG. 4 results in radial strips indicated 17 in the plates 9 and 10 and these act as strengthening strips for the plates 9 and 10. The number of apertures 27 in the plates 9 and 10 is maximised to provide the maximum number of uniflow cyclone separators 12. The plate 9 may be circular and not annular, as illustrated.

The net result of the design of the present invention is that the Uniflow TSS pressure-vessel is typically 3 or 4 times smaller in volume, and hence significantly cheaper to manufacture, than any existing reverse-flow TSS for the same gas feed rate. Despite its very compact external dimensions, the Uniflow TSS still provides comfortable internal space for man-access to all components for inspection and maintenance. Manholes 14 provide access to upper and lower chambers "A" and "C", while entry to the chamber "B" zone between the plates 9 and 10 is possible through the hatch 15, where the plate 9 is of the optional annular form. It will be seen from the above that removal of cyclone components for replacement or servicing can be readily achieved. Operation of the Uniflow TSS of the present invention will now be described in detail with reference to FIG. 3. The feed stream 16 of hot FCC flue gas enters the TSS pressure vessel 13 via inlet nozzle 16 and passes through a screen 19 which intercepts any entrained FCC refractory lumps and deflects them into a debris bin 20. The bin 20 is emptied each time there is a plant shut down for maintenance, The ability of the bin 20 to be removed improves access for workmen to the inner components of the unit.

The screened flue gas in zone "A" is then introduced into each and every TSS cyclone 12 via its axial-flow vane pack 8. This imparts a tangential velocity component, ideally in the range 40–60 m/s, to the cyclone gas flow, causing catalyst particles to be flung to the inside wall of the cyclone barrels 23. Catalyst fines from the multiple parallel TSS cyclones 12 are carried in steams of underflow gas 21 to a single solids outlet 22. The required total flowrate of TSS underflow gas 21 is preferably in the range 0.5–2.5% of the stream 16 feed gas rate.

Catalyst fines are preferably separated from underflow gas 21 in a fourth stage separator device indicated 28. While many different arrangements are possible to achieve this separation, such as external cyclones and/or high temperature ceramic filters, a preferred arrangement would be one in which a single, simple uniflow cyclone is integrated into the Uniflow TSS design of the present invention. As illustrated this would include a swirl-vane pack 24, preferably identical to the vane packs 8 thereby lowering design and construction costs. This integrated design concept simplifies external piping, avoiding large diameter hot lines with high loads of erosive catalyst dust, and eliminates the need for separate housing or support of the fourth stage separator. Excellent dust separation has been achieved with the uniflow cyclone characteristics described above. Clean underflow gas 25 leaves the fourth stage separator to be flow controlled, most readily by a critical flow orifice, to a remote waste heat recovery system.

Collected solids are carried away from the fourth stage separator in a secondary underflow gas steam 26, typically only 2% of stream 25. From this very small gas flow 26 fines are deposited in a waste catalytic hopper (not shown) for subsequent cartage off-site. The flow rate of gas stream 26 may be controlled, and its pressure reduced, by a second appropriately sized critical flow orifice placed either in the gas-feed line or the gas-vent line of a pressurised waste-catalyst hopper, depending on whether the hopper is required to operate at ambient or regenerator pressure. The ultimately cooled flow of hopper vent gas may optionally be passed via a small, low-cost bag filter on-route to a FCC chimney stack to positively minimise final particulate emissions to atmosphere.

The foregoing is a description of a preferred embodiment of the separator proposed by the present invention. Changes can be made to the components of the described embodiment without departing from the inventive concepts disclosed. For example, the fourth stage cyclone separator 28 is only a preferred element of the separator 1 and could, as required, be positioned external to the separator casing 11.

In another arrangement not illustrated, the preferred embodiment of FIG. 3 can be modified by having the inlets to the uniflow separators 12 tangential radial (as illustrated in FIG. 2) and not axial. The advantage of the axial inlet separators is that more separators can be placed in the divider plates than is possible if the inlets are radial.

I claim:

1. A separator apparatus for treating a heated feed gas having entrained particulate material, said separator apparatus comprising:

a casing divided into three separate casing zones separated by dividers, with a gas inlet into a first casing zone of said separate casing zones;

a plurality of uniflow centrifugal separators supported by the dividers, with a gas inlet for each of said uniflow centrifugal separators from the first casing zone of said casing zones, each of said uniflow centrifugal separators for centrifugally redistributing particulate material in a feed gas passing through the uniflow centrifugal separator for providing a particle rich underflow gas stream and a particulate lean larger volume overflow gas stream;

an overflow gas stream discharge from each of said uniflow centrifugal separators into the third casing zone of said casing zones;

a discharge port connecting the third casing zone of said casing zones to an exterior of said casing;

an underflow gas stream discharge from each of said uniflow centrifugal separators into the second casing zone of said casing zones; and, underflow gas delivery means passing through the third casing zone of said casing zones for connecting the second of said casing zones to the exterior of said casing.

2. The separator apparatus according to claim 1, having two of said dividers with each of said dividers being a divider plate having continuous strength strips radiating from a central point of the divider plate with perforations between the continuous strengthening strips of the divider plate.

3. The separator apparatus according to claim 2, wherein said divider plates are annular in shape.

4. The separator apparatus according to claim 1, further comprising an additional uniflow cyclone separator mounted in said underflow gas stream discharge from said second casing zone.

5. The separator apparatus according to claim 4, wherein said underflow gas stream discharge for said second casing zone downstream from said additional uniflow cyclone separator has a first discharge port for overflow gas from said additional cyclone separator and a second discharge port for underflow gas from said additional cyclone separator.

6. The separator apparatus according to claim 1, wherein the gas inlet into said first casing zone includes filter means in the form of a screen for trapping particles of a size to large for passing through the screen.

* * * * *